Patented Aug. 15, 1939

2,169,983

UNITED STATES PATENT OFFICE 2,169,983

PROCESS OF PRODUCING DRY MAGNESIUM HYDROXIDE AND PRODUCTS THEREOF

Bruce Walton, Glenbrook, Conn., assignor to Chas. H. Phillips Chemical Co., New York, N. Y., a corporation of Connecticut No Drawing. Application February 18, 1938, Serial No. 191,225

5 Claims. (Cl. 23—201)

The present invention relates to a process of preparing a dry magnesium hydroxide having a small particle size and to the products of that process. In practice magnesium hydroxide is always initially prepared in the form of an aqueous suspension. In this original form the particles of magnesium hydroxide are of a very small size—a form which is generally regarded as being very desirable. Aqueous suspensions of magnesium hydroxide are bulky and inconvenient to handle since they usually contain as much as ninety or more percent water. This is particularly true of the usual 8% suspension of magnesium hydroxide in water. It is therefore often desirable or necessary to remove the water from such suspensions by evaporation and drying, a solid magnesium hydroxide being obtained. Unless special precautions are taken in the drying process, however, a dry solid magnesium hydroxide is obtained which is rough, hard and granular and which, due to a change in particle size, will not give a suspension containing the finely divided particles of the original suspension.

It has been proposed to evaporate and dry suspensions of magnesium hydroxide in the presence of an added sugar such as for example cane sugar, whereby a dried powdery product can be obtained. Such a product, to a surprising degree, can be converted into an aqueous suspension wherein the particles of magnesium hydroxide have substantially the same size as in the original suspension from which they have been derived. In preparing such an improved powder sugar and magnesium hydroxide in aqueous suspension are evaporated while stirring and preferably under a vacuum to substantial dryness and the resulting solid material is ground and powdered. The sugar and magnesium hydroxide may be employed, for example, in the ratio of 70 parts cane sugar to 30 parts of magnesium hydroxide.

While the above mentioned process and product represent a most important advance in the art over former methods of drying aqueous suspensions of magnesium hydroxide and products obtainable thereby, I have now found that still better results can be obtained if the evaporation and drying of the sugar-magnesium hydroxide aqueous suspensions is carried out in the presence of dissolved tribasic magnesium citrate.

It is accordingly an object of my invention to evaporate and dry an aqueous sugar-magnesium hydroxide suspension in an improved manner.

It is a further object of my invention to obtain therefrom a new and improved dry magnesium hydroxide which upon contact with water gives a suspension of magnesium hydroxide in water in which the particles of magnesium hydroxide are smaller and more nearly of the same size as those contained in the original aqueous suspension from which such magnesium hydroxide has been derived than has been heretofore possible.

In evaporating and drying magnesium hydroxide in accordance with my invention I may prepare magnesium citrate in situ by adding free citric acid to the sugar-magnesium hydroxide aqueous suspension or I may add magnesium citrate as such. In either case I may also add sodium or another alkali metal citrate to the suspension, such sodium or other alkali metal citrate being employed for the purpose of increasing the solubility of magnesium citrate and enhancing its efficacy in my process. In one modification of my process I may proceed as follows:

To 1000 grams of an aqueous suspension of magnesium hydroxide (8%) I add 104.2 grams of cane sugar and 33.7 grams of anhydrous citric acid. This mixture is then evaporated to dryness while stirring and preferably while employing a vacuum. The resulting dry product contains 31.0% magnesium hydroxide, 19.0% magnesium citrate and 50.0% sugar. In the example the magnesium citrate may be added as such instead of being prepared in situ, although in carrying out the process in the absence of sodium or another alkali metal citrate it is preferable to prepare the magnesium citrate in situ.

In practice I prefer to employ magnesium citrate with the addition of a substantial amount of sodium citrate, since the latter improves the solubility and efficacy of the magnesium citrate in my process. In this form of the invention I may take, for example, 800 grams of an aqueous suspension of magnesium hydroxide (8%) and add thereto 105.5 grams of cane sugar, 39.5 grams magnesium citrate and 16 grams of sodium citrate. After evaporation of the water, preferably while stirring the suspension and applying a vacuum, a dry material is obtained which may be ground and powdered. The final powder contains 28.5% magnesium hydroxide, 46.9% sugar, 17.5% magnesium citrate and 7.1% sodium citrate.

Both products specifically described above give aqueous suspensions in which the magnesium hydroxide is present in the form of very fine particles. In this respect they are superior to the product obtained by the evaporation of a simple sugar-magnesium hydroxide aqueous suspension. It is therefore evident that the addition of magnesium citrate or the addition of magnesium citrate and sodium citrate serves in some manner to protect the particles of magnesium hydroxide in the magnesium hydroxide-sugar mixture so that agglomeration of said particles into hard, solid nuclei is prevented and a product of truly reversible character is obtained. The exact manner in which the magnesium citrate or magnesium citrate and sodium or other alkali metal citrate functions is not clearly understood and I make no attempt to explain said mode of operation.

In carrying out my process I may employ magnesium hydroxide, sugar, magnesium citrate and, if desired, an alkali metal citrate in widely varying proportions. The magnesium hydroxide may consist of from 20% to 35% of the final product; the sugar of from 40% to 60%; magnesium citrate of from 10% to 20% and alkali metal citrate of from 6% to 12%.

The process is not limited to the evaporation of suspensions of magnesium hydroxide where such hydroxide is prepared in situ by chemical action but is, of course, also applicable to suspensions made by physically suspending previously prepared magnesium hydroxide, the result being in all cases a powdery solid which, on being contacted with water, will give a product containing magnesium hydroxide in suspension, the particle size of such hydroxide in such last mentioned suspension being substantially the same as in the suspension subjected to evaporation and drying in accordance with my process.

I claim:

1. A method of preparing a dried magnesium hydroxide which comprises removing the water from an aqueous suspension of magnesium hydroxide, sugar and magnesium citrate by evaporation and drying.

2. The process which comprises preparing an aqueous suspension of magnesium hydroxide, sugar, magnesium citrate and an alkali metal citrate, evaporating the water therefrom and drying the solid material obtained.

3. The process defined in claim 2 wherein the alkali metal citrate is sodium citrate.

4. A dry composition comprising finely divided magnesium hydroxide, sugar and magnesium citrate, said magnesium hydroxide being capable of forming a stable suspension on being mixed with water.

5. A dry composition comprising finely divided magnesium hydroxide, sugar, magnesium citrate and sodium citrate, said magnesium hydroxide being capable of forming a stable suspension on being mixed with water.

BRUCE WALTON.